United States Patent [19]

Aramaki

[11] Patent Number: 5,483,521
[45] Date of Patent: Jan. 9, 1996

[54] ASYNCHRONOUS TRANSFER MODE CELL SWITCHING SYSTEM

[75] Inventor: Toshiya Aramaki, Tokyo, Japan

[73] Assignee: NEC Corporation, Tokyo, Japan

[21] Appl. No.: 280,660

[22] Filed: Jul. 28, 1994

[30] Foreign Application Priority Data

Jul. 30, 1993 [JP] Japan ........................... 5-206876

[51] Int. Cl.⁶ ........................... H04Q 11/04; H04J 3/24
[52] U.S. Cl. ........................... 370/17; 370/60.1
[58] Field of Search ........................... 370/60, 60.1, 61, 370/62, 13, 17, 58.1, 58.2, 58.3

[56] References Cited

U.S. PATENT DOCUMENTS

| | | | |
|---|---|---|---|
| 5,222,063 | 6/1993 | Foglar et al. | 370/60 |
| 5,303,232 | 4/1994 | Proctor et al. | 370/60 |

OTHER PUBLICATIONS

Aramaki et al., "Evaluation of Delay in the Cell Distribution Type High Speed ATM Switch", 1991 Institute of Electronics Information, and Communication Engineers.

Primary Examiner—Douglas W. Olms
Assistant Examiner—Ricky Ngo
Attorney, Agent, or Firm—Foley & Lardner

[57] ABSTRACT

In a cell switching system having a plurality of input ports and a plurality of output ports in which cells of a fixed length packet input from said plurality of input ports are output from the desired output ports in accordance with address information added to each cell, a cell distributing section is provided, corresponding to an input port, to separate input cells at a unit of cell to output them to thus selected output line, an output cell switching section is provided, corresponding to the output line of the cell distributing section, to detect address information added to the cell, and to output to the output line depending on a sequence inputted of cells towards the same output line without replacing such order, and a cell output control section is provided, corresponding to the output port, to perform a cell sequence aligning control.

6 Claims, 6 Drawing Sheets

FIG. 6
*(PRIOR ART)*

ASYNCHRONOUS TRANSFER MODE CELL SWITCHING SYSTEM

BACKGROUND OF THE INVENTION

1. Field of the Invention

The present invention relates to an ATM (Asynchronous Transfer Mode) cell switching system in which information such as voices, data, and images are divided into each fixed length of cell and switched at a very high speed, and in particular relates to an ATM cell switching system capable of realizing a cell sequence control in the switching process using a simplified method.

2. Description of the Related (Prior) Art

Greatest concerns at the present time in this field are directed to the high speed cell switching system in which all the information, such as voices, data, and images, are divided into cells each of which is a fixed length of packet, the information is cellulated at a very high speed and is transmitted and switched using a simplified protocol. For such cell switching devices used in the high speed cell switching system, see the Articles, for example, Aramaki et al., "Evaluation of Delay in the Cell Distribution Type High Speed ATM Switch", in the Proceeding of the 1991 Institute of Electronics Information, and Communication Engineers. Autumn Meeting, B-305. In such Articles, there are described a cell distributing means provided corresponding to an input port, a plurality of cell switching means, and a cell sequential aligning means provided corresponding to an output port. The cell distributing means selects one cell switching means from among the plurality of cell switching means, and outputs the cell given of the time stamp showing the input time to the cell switching means. The plurality of cell switching means perform the switching processes, and the cell sequential aligning means outputs to the output port after aligning the cell output sequence using the time stamp given to the cell. The conventional cell switching system is described with its structure and operation using block diagrams in FIGS. 4, 5, and 6, assuming that two input lines are provided and a cell switching device is formed of two switch circuits.

Figure 4:
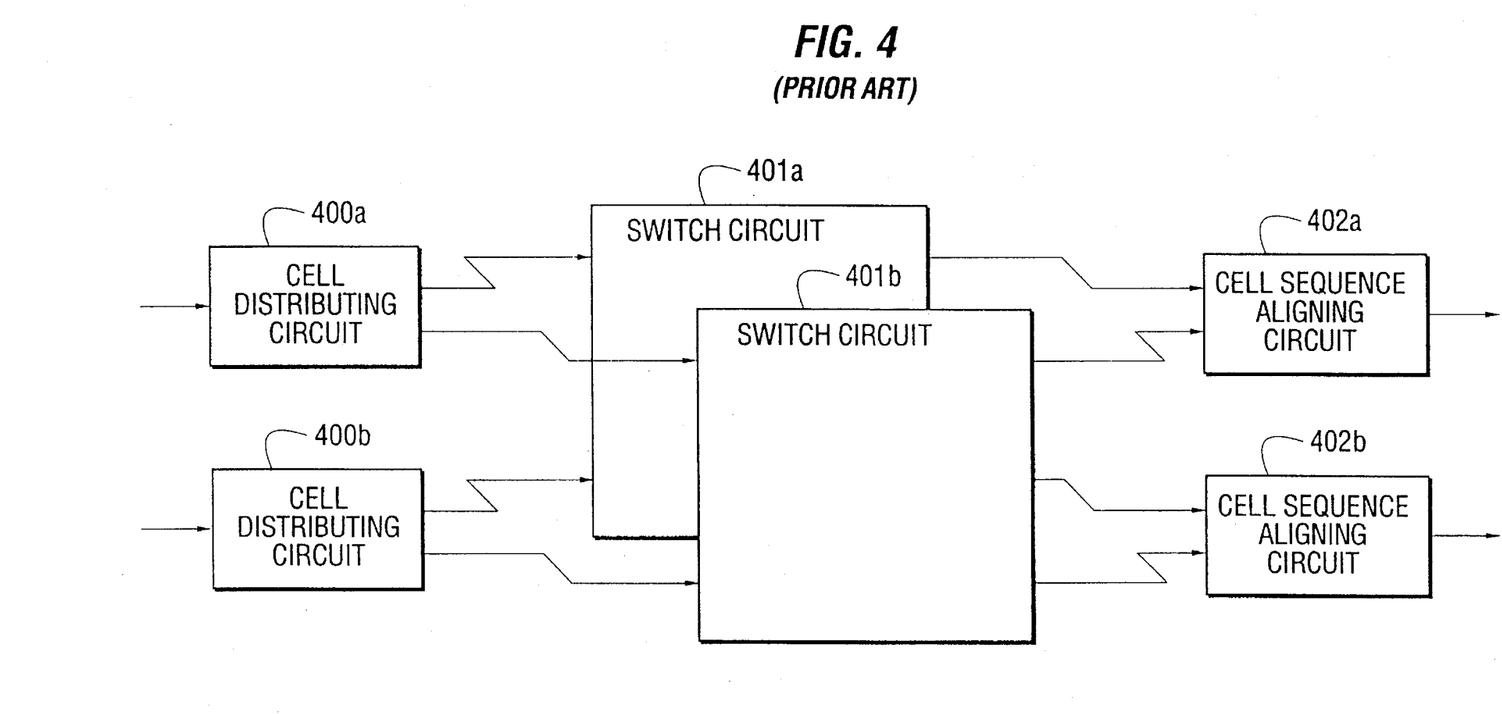
FIG. 4 is a block diagram showing one example of the conventional packet switching system.

FIG. 4 shows the cell switching device, wherein 400a, 400b depicts a cell distributing circuit, 401a, 401b depicts switch circuits receiving outputs of the cell distributing circuits 400a, 400b as inputs respectively, and 402a, 402b depicts cell sequence aligning circuits receiving outputs of the switch circuits 401a, 401b as inputs.

Figure 5:
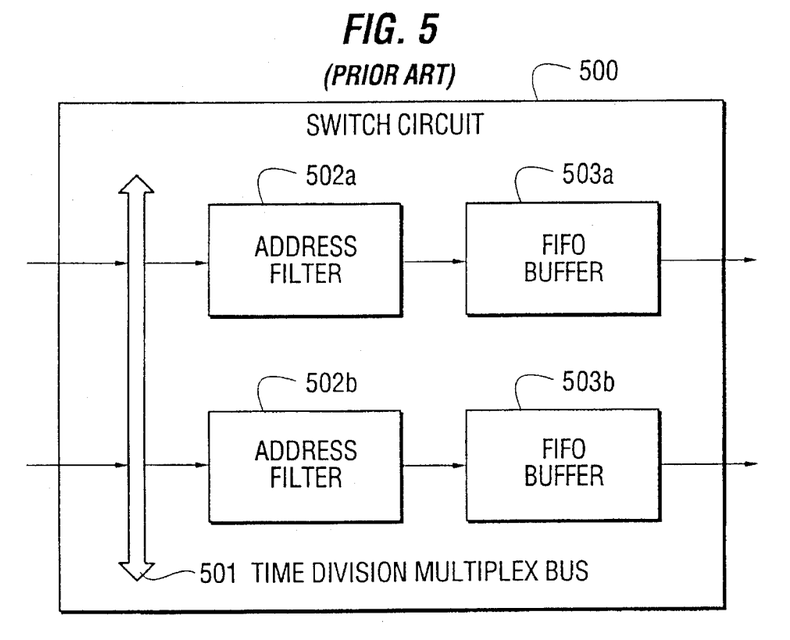
FIG. 5 is an illustrative view illustrating the example of the switch circuit in FIG. 4.

FIG. 5 shows the switch circuit, wherein 501 depicts a time division multiplex bus, 502a, 502b depicts address filters connected to the time division multiplex bus 501, and 503a, 503b depicts FIFO (First In First Out) buffers receiving outputs of the address filters 502a and 502b as inputs, respectively.

Figure 6:
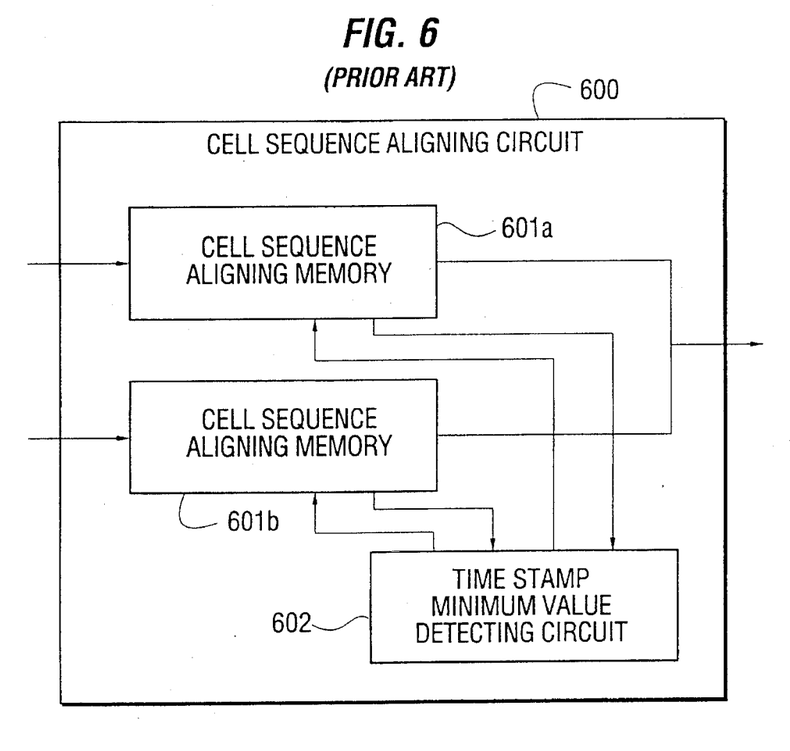
FIG. 6 is an illustrative view illustrating the example of the cell sequence aligning circuit in FIG. 4.

FIG. 6 shows the cell sequence aligning circuit, wherein 601a, 601b depict cell sequence aligning memories, and 602 depicts a time stamp minimum value detecting circuit performing outputting and inputting between the cell sequence aligning memories 601a, 601b b in respect of information.

FIGS. 4 to 6 designate examples of circuit operation. For basical circuit operation shown by the examples in FIGS. 4 and 5, the cell input from the input port is, at the cell distributing means 400a, 400b, given of the time stamp showing the input time, and is output to one switch circuit selected from a plurality of switch circuits. Thus the cell from the cell distributing means 400a, 400b is switched in accordance with address information given to the cell at the switch circuits 401a, 401b, and is output to the cell sequence aligning circuits 402a, 402b which is connected to the desired output ports. The cell sequence aligning circuits 402a, 402b output the cells to the output ports depending on the time stamp provided on the cell.

At that time, the switch circuit has a structure as shown in FIG. 5. The cell input from each input port of the switch circuit 500, is multiplexed in time division at the time division multiplex bus 501, and is input in a time divisional manner into the address filters 502a, 502b corresponding to each output port. The address filters 502a, 502b detect headers of the cells, subtract only the desirous cells, and output them to FIFO buffers 503a, 503b, which store and output the cells in a manner of "first in first out".

For operation of the cell sequence aligning circuit 600 in FIG. 6, the cells output from each switch circuit are stored in the cell sequence aligning memories 601a, 601b, provided at every switch circuit basis, which store and output the cells in a first in, first out basis. The time stamp minimum value detecting circuit 602 compares the time steps given to the cells stored in the head part of the cell sequence aligning memories 601a, 601b, to detect the smallest time-stamp, and to transmit control signals so that the cell having the smallest time-stamp is to be output from the cell sequence aligning memories 601a, 601b.

Disadvantageously, the conventional cell exchange system must compare a plurality of time stamps having a range of several bits, and further, on presence of a vacant cell sequence aligning memory, it must be confirmed that the cell having the smallest time stamp in the corresponding switch circuit does not exist. The present invention has been made for solving such problems. An object of the invention is to provide an ATM cell exchange system capable of realizing a cell sequence control by a simplified method without using a time stamp.

SUMMARY OF THE INVENTION

An ATM cell switching system according to the present invention, in a cell switching system having a plurality of input ports and a plurality of output ports in which cells of a fixed length packet input from the plurality of input ports are output from the desired output ports in accordance with address information added to such cells, is characterized by a cell distributing section, a cell switching section, and a cell output control section, in that;

the cell distributing section provided corresponding to the input ports, has one input line connected to one of the plurality of input ports and a plurality of output lines, sequentially selects one output line from the plurality of output lines, separates cells input from the input ports into each cell unit, and outputs to the selected output line. The cell switching sections are arranged in the same number corresponding to output lines of the cell distributing section, have a plurality of input lines and a plurality of output lines. The plurality of input lines are connected respectively to the different output lines of the cell distributing section to detect address information added to each cell. The cell switching sections output cells towards the same output line keeping the sequence of input, and obtain the number of cells towards the same output lines at the same time for each output line basis, and transmit it together with an identifier indicating the corresponding cell switching section to the cell output control section. The cell output control section is provided corresponding to the output port, and sequentially receives the information of the number of cells towards the output port at the same time transmitted from the cell switching section together with an identifier indicating the corresponding cell switching section. The cell output control section extracts the number of cells and the identifier from received information which has been input the fastest, and sends out a request signal to the cell switching section indicated by the corresponding identifier for outputting one cell, wherein the information of number of cells is subtracted by 1. If a value of the subtracted number of cells reaches 0, the corresponding information of the number of cells and the identifier is discarded. Further, if a value of the subtracted number of cells does not reach 0, the corresponding number of cells is replaced by the subtracted value.

The cell switching section in the ATM cell switching system of the present invention is characterized by a time division selector accommodating a plurality of input lines of the cell switching section, selecting the cells input from each input line in time divisional manner to distribute into a plurality of output lines by the time division multiplexing. The cell switching section is also characterized by an address filter provided corresponding to the output port, receiving the cells output from the time division selector, discriminating address information added to each cell, receiving and passing only the cells to be routed to the output ports corresponding to its own output parts. The address filter obtains the number of cells received and passed through at the same time, and transmitting such information of the number of cells and the identifier indicating its own cell switching section to the cell output control section. The cell switching section is further characterized by a first-in-first-out (FIFO) buffer provided corresponding to the address filter, storing the cells passed through such address filter at the arrived order, and outputting the stored cells one by one at the arrived order to the output ports in accordance with the instruction of the cell output control section.

The cell output control section in the ATM cell switching system of the present invention, is characterized by a number of cells storage memory receiving a number of cells towards the same output line at the same time transmitted from the cell switching section and an identifier indicating the cell switching section, and storing such information at the received order. The cell output control section is also characterized by a decoder recognizing the identifier of the information stored in the head part of the number of cells storage memory, and instructing a cell switching section corresponding to its identifier to output one cell to the output port. The cell output control section is further characterized by a number of cells storage subtracting section reading a value of number of cells stored in the head part of the number of cells storage memory, subtracting 1 from the value of such number of cells. If a value of the subtracted number of cells reaches 0, the corresponding information of number of cells and the identifier is discarded, and if a value of thus subtracted number of cells does not reach 0, the corresponding number of cells is replaced by the subtracted value.

In this way, the ATM cell switching system of the present invention performs sequence aligning control of the cells in accordance with the number of cells, towards the same output direction at the same time, calculated at every address filter basis of each cell switching section, without giving the time stamp indicating the input time of each cell.

BRIEF DESCRIPTION OF THE DRAWINGS

The present invention will be described in further detail with reference to the accompanying drawings, in which.

DETAILED DESCRIPTION

The present invention is described referring to the drawings. In the drawings hereinafter shown assume that of two input ports and output ports and two sets of cell switching sections are provided respectively unless any particular explanation is otherwise provided.

Figure 1:
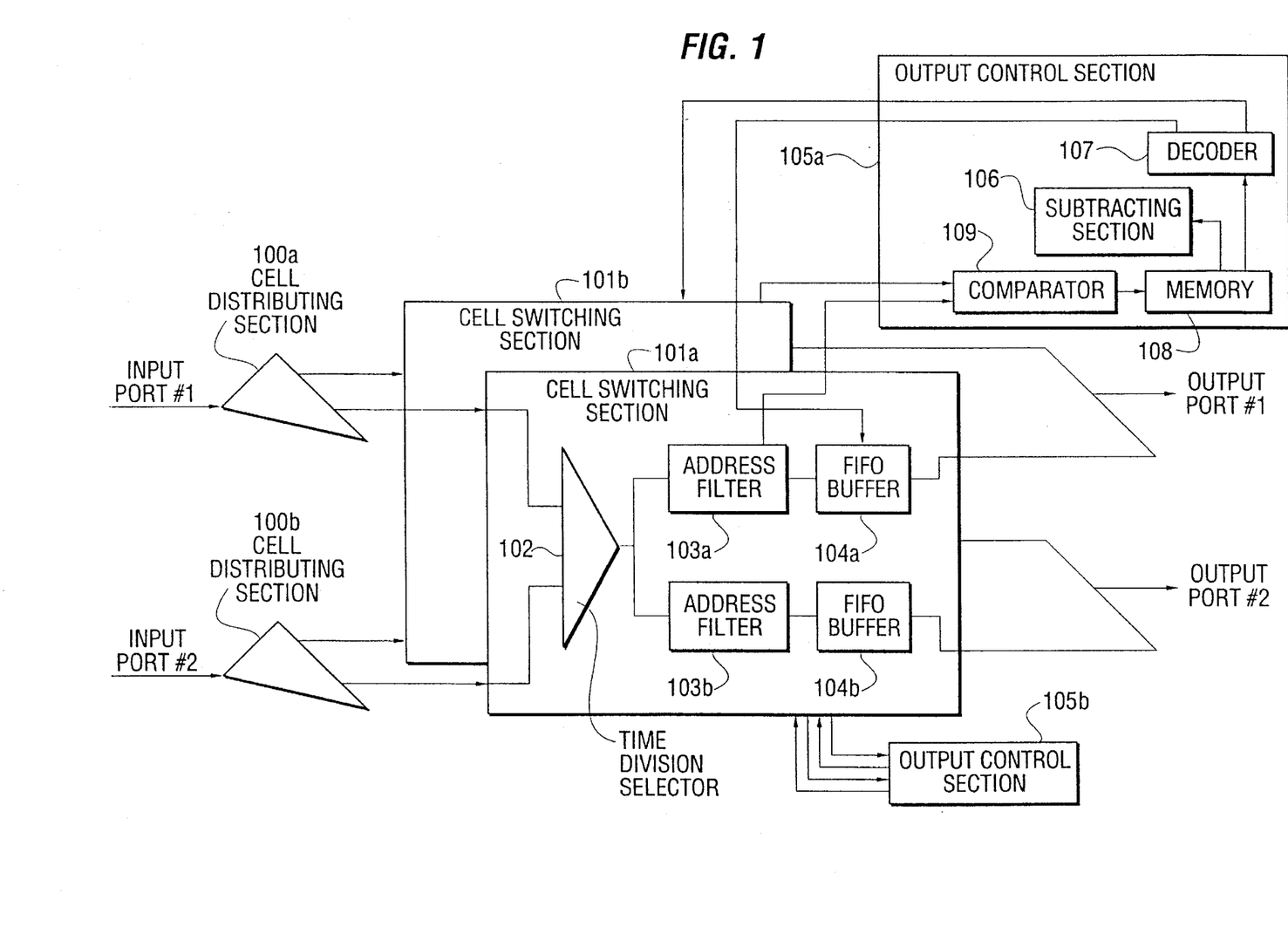
FIG. 1 is a block diagram showing one embodiment of an ATM cell switching system according to the present invention.

FIG. 1 is a block diagram showing one embodiment of an asynchronous transfer mode (ATM) cell switching system according to the present invention, which is a basic structure illustrating a principle of the invention.

In FIG. 1, 100a, 100b depict cell distributing sections, which are provided corresponding to the input ports and have functions in that a plurality of cells input from the input ports are separated into each cell unit, with one input line and a plurality of output lines being provided therein. The input line is connected to the input port, one output line is sequentially selected from the plurality of output lines, and the cells input from the input ports are output to the selected one output line. Numerals 101a, 101b depict cell switching sections, which are provided in the amount equal to the number of output lines of the cell distributing sections 100a, 100b. The cell switching section has a plurality of input lines and a plurality of output lines. The plurality of input lines are connected to output lines of different cell distributing sections respectively, and detect address information of the input cell. Thereby, the cells towards the same output line are output to the output line in a manner of a cell input sequence that keeps such sequence order. The cell switching section functionally obtains the number of cells toward the same output line at the same time for each output line basis, and transmits such information to the cell output control section.

Numerals 105a, 105b depict output control sections, provided corresponding to the output ports, having a plurality of inputs being connected to the different cell switching sections 101a, 101b, respectively. The output control section is formed of a number of cells storage memory 108, a number of cells storage subtracting section 106, and a number of cells storage comparator 109. The number of cells storage comparator 109 receives the number of cells toward the same output line at the same time division interval from the cell switching section together with an identifier designating such cell switching section, and if the number of cells is greater than zero, it is input into the number of cells storage memory 108. The number of cells storage subtracting section 106 extracts both the number of cells which have been input into the number of cells storage memory 108 at the earliest time, and an identifier corresponding to such number of cells, and transmits a request of cell output to the cell switching section designated by the identifier corresponding to such information of number of cells. The value of number of cells is subtracted by one, and if the subtracted value is less than zero, such information of number of cells and corresponding identifier is discarded from the number of cells storage memory 108. If the subtracted value is more than zero, such number of cells is replaced with that subtracted value.

The cell distributing sections 100a, 100b may preferably have a function that a plurality of cells coming from the input ports are separated into a cell unit, each output direction of cells can sequentially be changed. In addition, the cell distributing sections corresponding to all the input ports are synchronously operated.

Each cell switching section 101a, 101b includes a time division selector 102, address filters 103a, 103b and FIFO buffers 104a, 104b. The time division selector 102, which is connected to each input line of the corresponding cell switching section, selects the cells input from each input line a time divisional manner, to multiplex in time division, and to distribute into a plurality of outputs. The address filters 103a, 103b, are provided corresponding to each output port, each having an input connected to the time division selector 102, and receiving the cells output from the time division selector 102 to discriminate address information of those cells which will be output to the corresponding output ports. Furthermore, the number of cells, toward the same output port, which have arrived at the time division selector 102 at the same time division interval are obtained and transmitted to the output control sections 105a, 105b. FIFO buffers 104a, 104beach have an input connected to the address filters 103a, 103b, and each store the cells received by the respective address filters 103a, 103b, and output them to the output ports.

In the embodiment, the cell switching sections 101a, 101b are structured output buffer type cell switches having the cell buffers corresponding to each output port. However, if the same are structured cell switches performing the switching process and output of the cells keeping the sequence order, then both structures may preferably be available; namely, a common buffer type switch which the cell buffer corresponding to each output port is commonly used for all the output ports; and a cross point type switch having buffers at each cross point of input and output.

Each output control sections 105a, 105b includes the number of cells storage comparator 109, the number of cells storage memory 108, a decoder 107, and the number of cells storage subtracting section 106. The input of the number of cells storage comparator 109 is connected to both of the number of cells indicating signal output from the address filters 103a, 103b of the cell switching sections 101a, 101b and the identifier signal output from the cell switching sections 101a, 101b, and selectively receives the number of cells indicating signal whose value is greater than zero in a time division manner, together with the identifier of the cell switching section which has processed those cells. The number of cells storage memory 108 is connected on its input with an output of the number of cells storage comparator 109, and stores and outputs the cell storage number output from the number of cells storage comparator 109 and the identifier of the cell switching section. The decoder 107 is connected on its input with an output of the number of cells storage memory 108, and in accordance with an identifier of the cell switching section output from the number of cells storage memory 108, a cell transmission request signal to the FIFO buffer 104a of the cell switching sections 101a, 101b is produced. The number of cells storage subtracting section 106 is connected on its input with the output of the number of cells storage memory 108. The value of the number of cells output from the number of cells storage memory 108 is subtracted by one, and if the value of the number of cells comes to zero, then the information of the number of cells which has fastest been input into the number of cells storage memory 108 from the number of cells storage comparator 109 and the identifier of the cell switching section is discarded. In cases other than those described above, the number of cells storage memory 108 is controlled in that the information of the number of cells which have been input into the number of cells storage memory 108 at the earliest time from the number of cells storage comparator 109 is replaced by the value of the number of cells having been subtracted.

Figure 2:
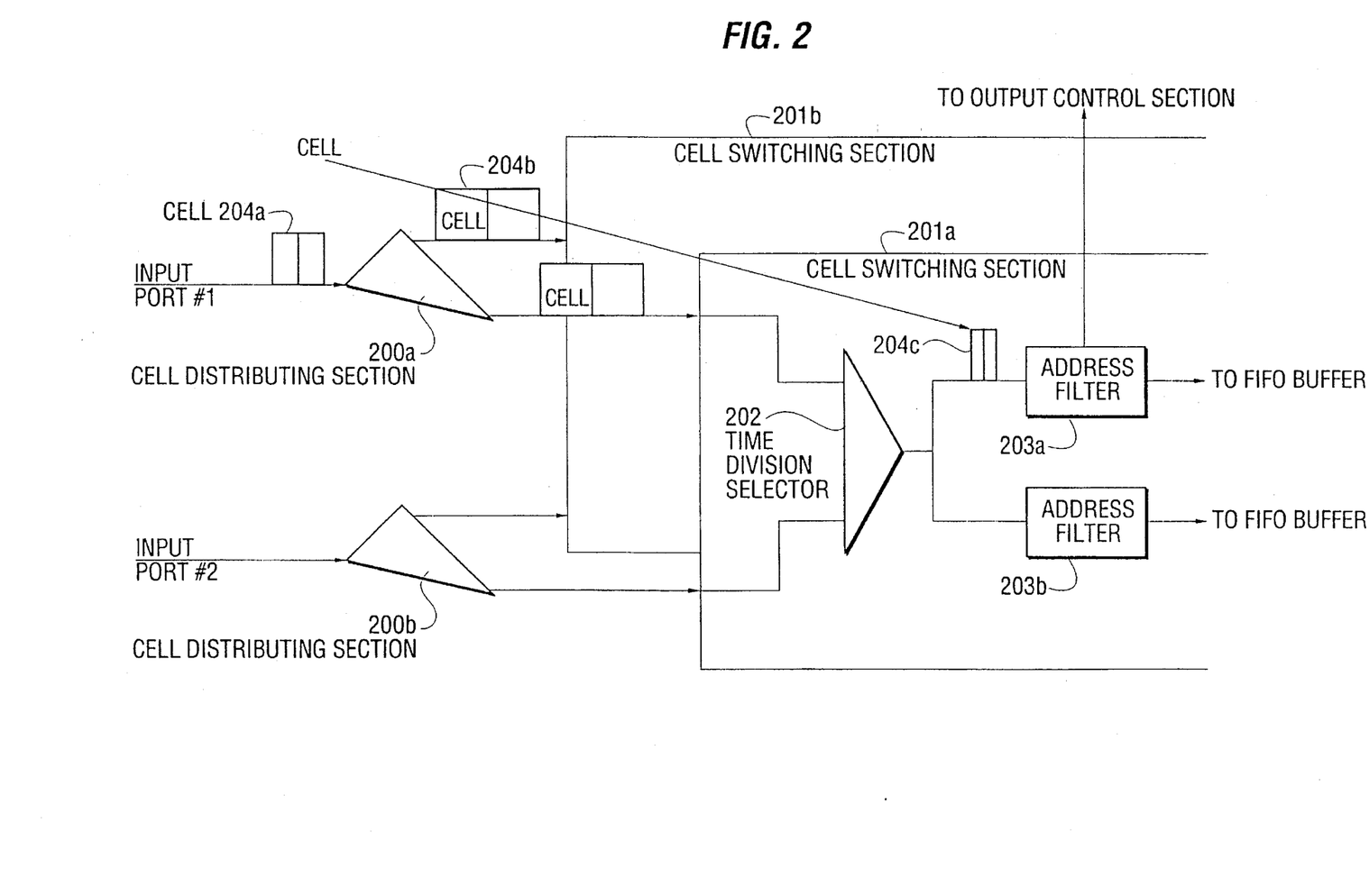
FIG. 2 is an illustrative view for illustrating operation of a cell distributing section and a cell switching section in FIG. 1.
Figure 3:
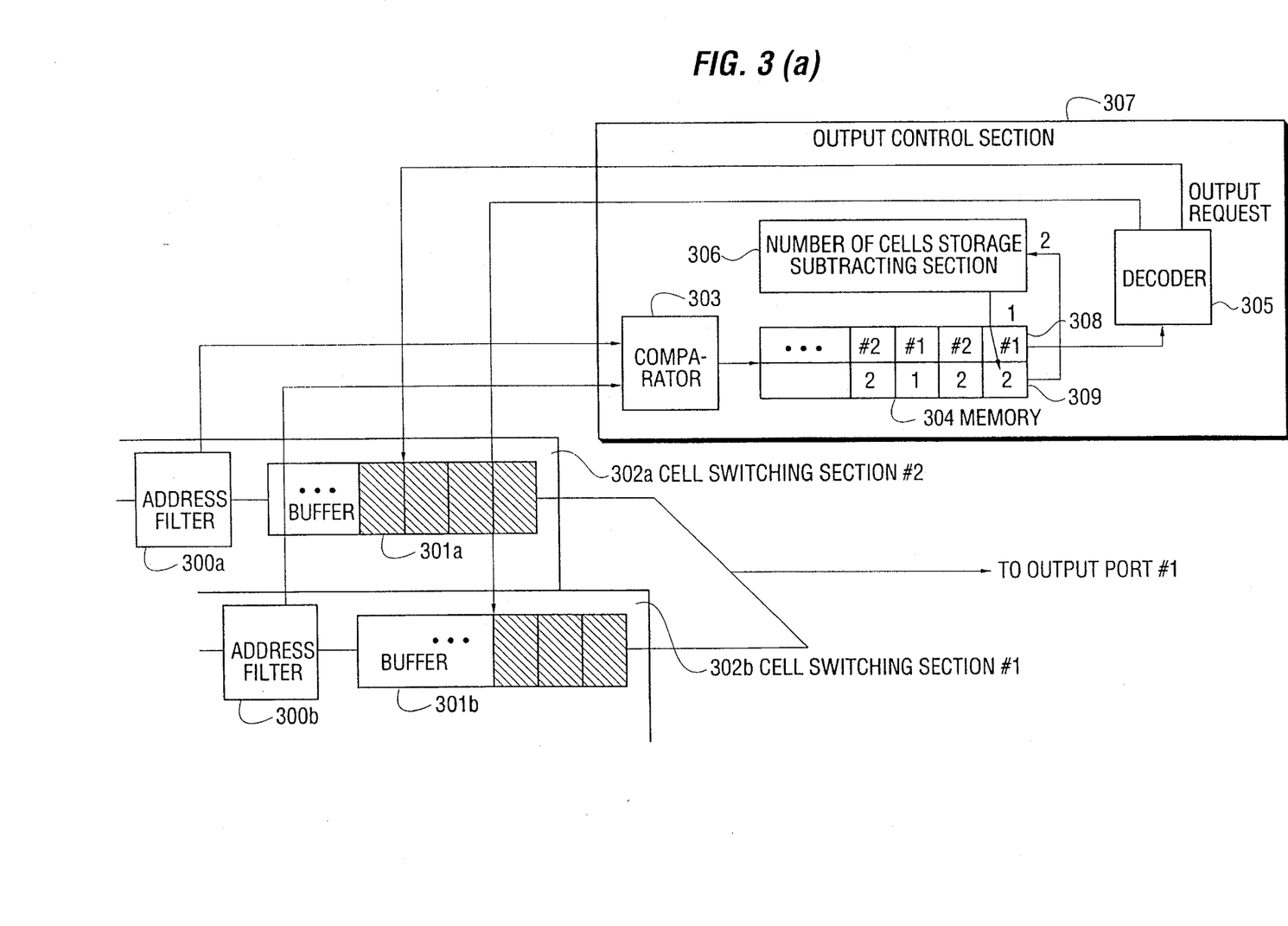
FIGS. 3(a) and 3(b) are illustrative views for illustrating operation of an output control section in FIG. 1.

FIGS. 2 and 3 show a cell switching section of FIG. 1, illustrating a basical operation of an output control section. FIG. 2 is an operation example relating to input ports and to address filters, and FIG. 3a or FIG. 3b is an operation example of the output control section. For simplified explanation, assume that the cells input from the input ports are all towards the output port #1.

The cells input from the input ports are separated into each cell unit by cell distributing sections 200a, 200b, thus an input speed to each cell switching section 201a, 201b comes to the line speed of the input port / the number of cell switching sections. The cells input into the cell switching sections 201a, 201b are multiplexed by the time division selector 202, and are output to each address filter 203a, 203b. The address filters 203a and 203b, which are provided corresponding to the output ports, extract only desired cells towards the corresponding output port to output to the FIFO buffer. From among the cells input into the time division selector 202 at the same time division interval, the number of cells extracted by its own address filter and the identifier showing its own cell switching section both are output to the output control section.

In FIG. 3(A), in an output control section 307, the information of the identifier of the cell switching section which have been input in the number of cells storage memory 304 at the earliest time, in which the information of the number of cells and the identifier indicating a cell switching section is being stored in accordance with output of address filters 300a, 300b is extracted, and the cell output request signal is sent to FIFO buffers 301a or 301b of the corresponding cell switching section. At the same time of the above, the value of the number of cells is extracted from the number of cells storage memory 304, and after subtracting by one, the value before subtracting in respect of the number of cells storage memory 304 is renewed by the subtracted value. However, if the subtracted value is equal to zero as shown in FIG. 3(B), the value before subtraction together with the identifier of the cell switching section is discarded.

The buffers of the cell switching sections 302a, 302b perform storage and output of the cell in accordance with the rule of FIFO. The number of cells storage memory 304 stores both the identifier of the cell switching section and the cell number with reference to an inputted sequence ranging to all of the cell switching sections 302a, 302b, thereby the output controls of the cell switching sections 302a, 302b are performed. This provides an output from the buffers of the cell switching section while maintaining a normal cell sequence.

In FIGS. 3(A) and 3(B), 300a, 300b depict address filters, 303 depicts a number of cells storage comparator receiving outputs of the address filters 300a, 300b as inputs, 305 and 305 depicts a decoder having an input of a cell switching section identifier 308 of the number of cells storage memory 304. The decoder 305 sends a cell output request to the buffers 301a, 301b of FIFO. Numeral 306 depicts a number of cells storage subtracting section receiving a stored number of cells 309 of the number of cells storage memory 304 as an input, and 307 depicts an output control section for containing those described above.

As hereinbefore fully described, in an ATM cell switching system which processes the cell switching on the high speed transmission line using a plurality of cell switching sections, the present invention is capable of realizing a cell sequence control by a simplified method without using time stamp because the number of cells directing to the same output at the same time for each address filter on the basis of each cell switching section is calculated to perform the sequence aligning control of the cells in accordance with such calculated values.

Although the present invention has fully been described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An asynchronous transfer mode (ATM) cell switching system having a plurality of input ports and a plurality of output ports in which a plurality of cells, each having a fixed packet length, being inputted from said plurality of input ports, switched, and being outputted from a desired one of said plurality of output ports in accordance with address information contained in each of said plurality of cells, comprising:

a plurality of cell distributing sections respectively coupled to said plurality of input ports, and each having an input line and a plurality of output lines, said input line being coupled to a corresponding input port of said ATM cell switching system and receiving cells through said corresponding input port, each of said plurality of cell distributing sections separating said received cells into individual cells, and outputting said individual cells through one of said plurality of output lines which has been sequentially selected for routing;

a plurality of cell switching sections each coupled to a corresponding one of said plurality of output lines of each of said cell distributing sections, each of said cell switching sections having a plurality of input lines and a plurality of output lines, each of said plurality of input lines being coupled to said corresponding one of said plurality of output lines, said plurality of output lines of said cell switching sections being coupled to a corresponding one of said plurality of output ports of said ATM cell switching system, wherein each of said cell switching sections receives said individual cells outputted from said one of said plurality of output lines of each of said cell distributing sections, detects the address information contained in each of said received individual cells, switches said received individual cells in accordance with the address information by routing said received individual cells to a desired one of said output ports of said ATM cell switching system, and obtains a number of cells which are to be outputted at a same time division interval through said desired one of said output ports on a first in, first out basis, and transmits the number of cells together with an identifier indicating a particular one of said cell switching sections that is holding the number of cells; and a plurality of cell output control sections each of which is respectively coupled to said output ports of said ATM cell switching system, each of said plurality of cell output control sections sequentially receiving and storing information on a first in, first out basis, said information corresponding to the number of cells to be outputted at the same time division interval through said desired one of said output ports together with the identifier indicating said particular one of said cell switching sections that is holding the number of cells, wherein each of said plurality of cell output control sections extracts information which has been stored for a longest time in said each of said plurality of cell output control sections and executes a control operation of sending out a cell outputting request signal to said particular one of said cell switching sections indicated by the identifier contained in the extracted information and counting down the number of cells to be outputted at the same time division interval obtained from said extracted information by subtracting the number of cells by one, and when the counting down result has become zero, extracts information stored for the next longest time in said each of said plurality of cell output control sections.

2. An asynchronous transfer mode (ATM) cell switching system as claimed in claim 1, wherein said each of said cell switching sections comprise:

a time division selector coupled to a respective one of said output lines of said cell distributing sections, said time division selector selects said received individual cells and multiplexes said received individual cells in a time division manner on an output port of said time division selector;

a plurality of address filters respectively coupled to said output port of said time division selector, each of said plurality of address filters discriminates the address information contained in each of said received individual cells obtained from said time division selector, receives and passes only the received individual cells to be routed to said respective one of said output ports, counts the number of cells passed through in the same time division interval, and transmits the information of the number of cells counted and an identifier to said respective one of said cell output control sections indicating the corresponding one of said cell switching sections in which said each of said address filters belongs; and a plurality of first-in-first-out (FIFO) buffers respectively coupled to said plurality of address filters, each of said plurality of FIFO buffers stores cells having passed through said respective address filters in accordance with an arrival sequence order and outputs cells one by one with a sequence order of a cell outputting request signal received from one of said cell output control sections.

3. An asynchronous transfer mode (ATM) cell switching system as claimed in claim 2, wherein each of said cell output control sections comprises:

a comparator coupled to said cell switching sections for discriminating an existence of the number of cells contained in the information supplied from one of said address filters together with the identifier of a corresponding one of said cell switching sections in which said one of said address filters belongs, and outputs the information in which the number of cells is contained;

a memory coupled to said comparator for storing the information outputted from said comparator in accordance with the arrival sequential order;

a decoder coupled to said comparator for extracting the identifier of the corresponding one of said cell switching sections and storing the identifier in said memory on a first in, first out basis, discriminating the corresponding one of said cell switching sections, and sending a cell output request signal to said FIFO buffers of the corresponding one of said cell switching sections; and a number-of-cells subtracting section coupled to said memory for extracting information that has been stored for a longest time in said memory, said information including a value corresponding to a number of cells, counting down the value corresponding to the number of cells by subtracting one from the value corresponding to the number of cells, renewing the value corresponding to the number of cells with the subtracted value if the subtracted result is not zero, and discarding the information stored for the longest time in said memory if the subtracted result is zero.

4. An asynchronous transfer mode (ATM) cell switching system having a plurality of input ports and a plurality of output ports in which a plurality of cells are inputted from said plurality of input ports, switched, and outputted from a desired one of said output ports in accordance with address information contained in each of said plurality of cells, comprising:

a plurality of cell distributing sections respectively coupled to said plurality of input ports, each of said plurality of cell distributing sections having one input line and a plurality of output lines, said input line being coupled to a corresponding input port of said ATM cell switching system and receiving cells through said corresponding input port, each of said plurality of cell distributing sections separating said received cells into individual cells, and outputting said individual cells through one of said plurality of output lines which has been sequentially selected for routing;

a plurality of cell switching sections each coupled to a corresponding one of said plurality of output lines of said cell distributing section, each of said cell switching sections having a plurality of input lines and a plurality of output lines, each of said plurality of output lines being coupled to a corresponding one of said output ports of said ATM cell switching system, wherein each of said cell switching sections receives individual cells, detects address information contained in each of said received individual cells, switches said received individual cells in accordance with the address information by routing said received individual cells to a desired one of said output ports of said ATM cell switching system, and obtains a number of cells which are to be outputted at a same time division interval through said desired one of said output ports, and transmits the number of cells together with an identifier indicating a particular one of said cell switching sections that is holding the number of cells; and a plurality of cell output control sections each of which is coupled to a corresponding output port of said ATM cell switching system, each of said plurality of cell output control sections sequentially receiving and storing information corresponding to the number of cells to be outputted at the same time division interval through said desired one of said plurality of output ports together with the identifier indicating said particular one of said cell switching sections that is holding the number of cells, wherein each of said plurality of cell output control sections controls consecutive, sequential outputting of said received individual cells from the same time division interval.

5. A method for sending a plurality of cells in an asynchronous transfer mode (ATM) cell switching system having a plurality of input ports and a plurality of output ports in which said plurality of cells are inputted from said plurality of input ports, switched, and outputted from a desired one of said output ports in accordance with address information contained in each of said plurality of cells, the method comprising the steps of:

a) receiving said plurality of cells along with the address information for each of said plurality of cells indicating a desired one of said output ports that said each of said plurality of cells are to be output from;

b) switching said plurality of cells in a time division manner through a switching device coupled between said input ports and said output ports;

c) determining a value corresponding to how many of said plurality of cells have been switched at a same time division interval; and d) sequentially outputting said plurality of cells to said desired one of said output ports based on said value.

6. A method for sending a plurality of cells in an ATM cell switching system as claimed in claim 5, wherein in the step d), said value is subtracted by a value of one every time one of said plurality of cells is output, and when said value is equal to zero, an end completion signal is produced indicating that all of said plurality of cells from the same time division interval have been output from said desired one of said output ports.

* * * * *